(12) United States Patent
Cragun

(10) Patent No.: US 6,600,982 B1
(45) Date of Patent: Jul. 29, 2003

(54) SYSTEM, METHOD AND ARTICLE OF MANUFACTURE TO PROVIDE OUTPUT ACCORDING TO TRIP INFORMATION

(75) Inventor: Brian John Cragun, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 391 days.

(21) Appl. No.: 09/644,818

(22) Filed: Aug. 23, 2000

(51) Int. Cl.⁷ .......................... G01C 21/20; G01C 21/36
(52) U.S. Cl. .......................... 701/36; 701/204; 701/211; 340/994
(58) Field of Search .................... 701/36, 200, 201, 701/202, 204, 205, 211; 340/988, 990, 995, 994, 996; 455/456

(56) References Cited

U.S. PATENT DOCUMENTS

| | | | | |
|---|---|---|---|---|
| 4,190,819 A | * | 2/1980 | Burgyan .................... 340/996 |
| 4,791,571 A | | 12/1988 | Takahashi et al. .......... 364/436 |
| 4,799,162 A | * | 1/1989 | Shinkawa et al. .......... 701/117 |
| 4,982,332 A | | 1/1991 | Saito et al. ................ 364/449 |
| 5,153,836 A | | 10/1992 | Fraughton et al. .......... 364/461 |
| 5,218,629 A | | 6/1993 | Dumond, Jr. et al. ......... 379/59 |
| 5,243,529 A | | 9/1993 | Kashiwazaki ............... 364/449 |
| 5,428,545 A | | 6/1995 | Maegawa et al. ............ 364/444 |
| 5,602,739 A | | 2/1997 | Haagenstad et al. ........ 364/436 |
| 5,712,632 A | | 1/1998 | Nishimura et al. .......... 340/995 |
| 5,732,383 A | | 3/1998 | Foladare et al. ............ 701/117 |
| 5,790,974 A | | 8/1998 | Tognazzini ................. 701/204 |
| 5,874,905 A | | 2/1999 | Nanba et al. ............... 340/995 |
| 5,906,654 A | | 5/1999 | Sato .......................... 701/210 |
| 5,908,464 A | | 6/1999 | Kishigami et al. .......... 701/208 |
| 5,911,773 A | | 6/1999 | Mutsuga et al. ............ 701/200 |
| 5,931,888 A | | 8/1999 | Hiyokawa ................... 701/208 |
| 5,938,721 A | | 8/1999 | Dussell et al. .............. 701/211 |
| 5,959,577 A | | 9/1999 | Fan et al. ............... 342/357.13 |
| 5,987,377 A | * | 11/1999 | Westerlage et al. ......... 701/204 |
| 6,154,689 A | * | 11/2000 | Pereira et al. ................. 701/1 |
| 6,336,072 B1 | * | 1/2002 | Takayama et al. .......... 701/200 |
| 6,363,323 B1 | * | 3/2002 | Jones ......................... 701/213 |
| 6,411,891 B1 | * | 6/2002 | Jones ......................... 701/201 |

* cited by examiner

*Primary Examiner*—Tan Q. Nguyen
(74) *Attorney, Agent, or Firm*—Moser, Patterson, & Sheridan, L.L.P.

(57) ABSTRACT

A method, system and article of manufacture adapted to control output from one or more output devices connected to a data processing system disposed in a vehicle is provided. Illustrative output devices include a radio, a compact disc player, an internet-enabled device and the like. The output is adjusted according to the remaining travel time from a current position of the vehicle relative to a destination point or the elapsed time from an origination point.

73 Claims, 10 Drawing Sheets

300 — PROGRAMMING PROFILE

- 302 — TITLE :
- 304 — FILLER PROGRAM RECORDS :
- 306 — FRONT END PROGRAM RECORDS :
- 308 — BACK END PROGRAM RECORDS :
- 310 — FRONT END PRIORITY : (T/F)

400 — PROGRAM RECORD

- 402 — TITLE :
- 404 — SOURCE :
- 406 — LOCAL COPY :
- 408 — TYPICAL TIME :
- 410 — CURRENT ACTUAL TIME :

| TIME RECORD | 806 | 808 | 8:00 AM - 8:19 AM | 802 |
|---|---|---|---|---|
| | AVERAGE | COUNT | SIMILAR DAY OF THE WEEK AVERAGE | 810 |
| AVERAGE | | | ∅ | |
| MON. | | | TUES-FRI: | |
| TUES. | | | MON-,WEDS-FRI : | |
| WEDS. | | | MON-TUES,THRUS-FRI: | |
| THURS. | | | MON-WEDS-,FRI : | |
| FRI. | | | MON-THURS : | |
| SAT. | | | SUNDAY : | |
| SUN. | | | SAT : | |

| LOG RECORD | |
|---|---|
| POSITION : | 902 |
| DAY : | 904 |
| TIME : | 906 |
| AVERAGE SPEED : | 908 |

SYSTEM, METHOD AND ARTICLE OF MANUFACTURE TO PROVIDE OUTPUT ACCORDING TO TRIP INFORMATION

BACKGROUND OF THE INVENTION

1. Field of the Invention

The present invention relates to data processing. More particularly, the invention provides for programming operations according to travel information.

2. Background of the Related Art

Vehicles have long been equipped with output devices for use by an occupant of the vehicle during travel. Such devices are typically used for entertainment, business, and communication. Conventional output devices adapted for these purposes include radios, cassette players, compact disc (CD) players, MiniDisc players and the like. More recently, consumers have expressed a need to access the Internet during travel in vehicles. As a result of its broad capabilities, the Internet has become increasingly important medium of information exchange. It is currently possible to receive and enjoy a variety of multimedia objects via the Internet including streaming radio transmissions, audio files and the like. Accordingly, Internet-enabled equipment will soon become standard features in vehicles.

One problem with output devices adapted for use in vehicles, is the lack of flexibility offered to the vehicle occupants operating the output devices. For example, vehicle operators often have a preferred program schedule for a given travel itinerary, e.g., a drive from home to work. Illustratively, a preferred program schedule may include a combination of music, sports commentary and business news. While conventional output devices may be configurable to preestablished settings according to user preference (e.g., settings to selected radio station frequencies), the vehicle operator is still required to manually control the output devices in order to achieve the desired program schedule.

Therefore, there is a need for a method and system of operating output devices in a vehicle according to user-selected program preferences.

SUMMARY OF THE INVENTION

Embodiments of the invention provide for a method, system and article of manufacture adapted to control output from one or more output devices connected to a data processing system disposed in a vehicle. The output is adjusted according to a travel time.

One aspect of the invention provides for a method for controlling output to at least one output device from a vehicular data processing system according to a travel time. The method comprises: (i) parsing trip information comprising a destination position and a route of travel from an origination position to the destination position; (ii) parsing a programming profile selection, wherein the programming profile selection indicates a desired output from the data processing unit according to at least one of an elapsed travel time from the origination position and a remaining travel time to the destination position from a current position; and (iii) providing the desired output to the at least one output device connected to the data processing system.

Another aspect provides a signal bearing medium containing a program which, when executed by a processor of a vehicular data processing system, performs a method for controlling output to at least one output device from the vehicular data processing system according to a travel time. The method comprises: (i) parsing trip information comprising a destination position and a route of travel from an origination position to the destination position; (ii) parsing a programming profile selection, wherein the programming profile selection indicates a desired output from the data processing unit according to at least one of an elapsed travel time from the origination position and a remaining travel time to the destination position from a current position; and (iii) providing the desired output to the at least one output device connected to the data processing system.

Another aspect provides a data processing system adapted to be disposed in a vehicle and configured to provide output according to trip information. The data processing system comprises (i) a positioning system receiver configured to receive current position information indicating a current position of the data processing system; (ii) a memory containing a first data structure comprising output signal information; (iii) output signal execution logic configured to execute the output signal information according to trip information; (iv) and at least one output device configured to provide output according to the executed output signal information. The trip information comprises a destination position and a route of travel and at least one of (i) an elapsed travel time from an origination position to the current position; and (ii) a remaining travel time to the destination position from the current position.

BRIEF DESCRIPTION OF THE DRAWINGS

A more particular description of embodiments of the invention, briefly summarized above, may be had by reference to the appended drawings. It is to be noted, however, that the appended drawings illustrate only typical embodiments of this invention and are therefore not to be considered limiting of its scope.

DETAILED DESCRIPTION OF THE PREFERRED EMBODIMENT

In general, the present invention provides for a method, system and article of manufacture adapted to control output from one or more output devices connected to a data processing system disposed in a vehicle. The output is adjusted according to a travel time which, in some embodiments, is an elapsed time and/or an estimated time to arrival from a current position of the vehicle relative to a destination point.

One embodiment of the invention is implemented as a program product for use with a computer system such as, for example, the system 101 shown in FIG. 1 (described below). The information (i.e., programs and data structure) of the program product defines functions of the preferred embodiment and can be contained on a variety of signal/bearing media, which include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. Such signal-bearing media, when carrying computer-readable instructions that direct the functions of the present invention, represent embodiments of the present invention. The data structures and methods described below are illustrative of data which may be contained on the signal bearing medium.

Figure 1:
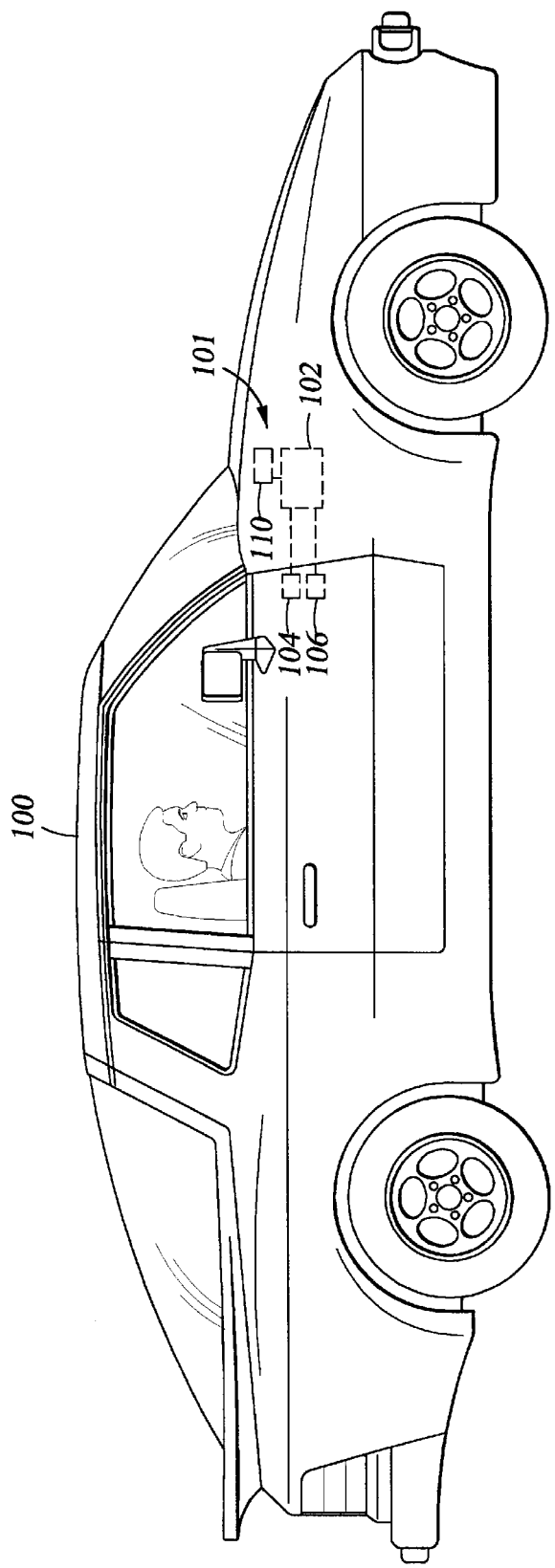
FIG. 1 shows a side view of a vehicle having a on-board computer system disposed theron.

FIG. 1 shows a schematic side view of a vehicle 100. Although shown as a land vehicle (i.e., automobile), the invention can be used to advantage in any vehicle. The vehicle 100 generally includes an onboard computer system 101 comprising a data processing unit 102 interfaced with input devices 104, output devices 106 and a global positioning system (GPS) receiver 110. The computer system 101 may be a permanent fixture of the vehicle 100 or may be or may be removable.

The input devices 104 can be any device to give input to the data processing system 102. For example, a keyboard, keypad, light-pen, touch-screen, track-ball or speech recognition unit could be used. The output devices 106 illustratively includes a conventional display screen adapted to view menu features for operating the data processing system 102. In addition, the output devices 106 include any number of multimedia devices such as audio/visual devices. Illustratively, multimedia devices include televisions, cassette tape players, CD players, MiniDisc players, radios and Internet enabled devices. Although shown separately, some or all of the input devices 104 and the output devices 106 could be combined. For example, a display screen with an integrated touch-screen, and a display with an integrated keyboard or a speech recognition unit combined with a text speech converter could be used.

Figure 2:
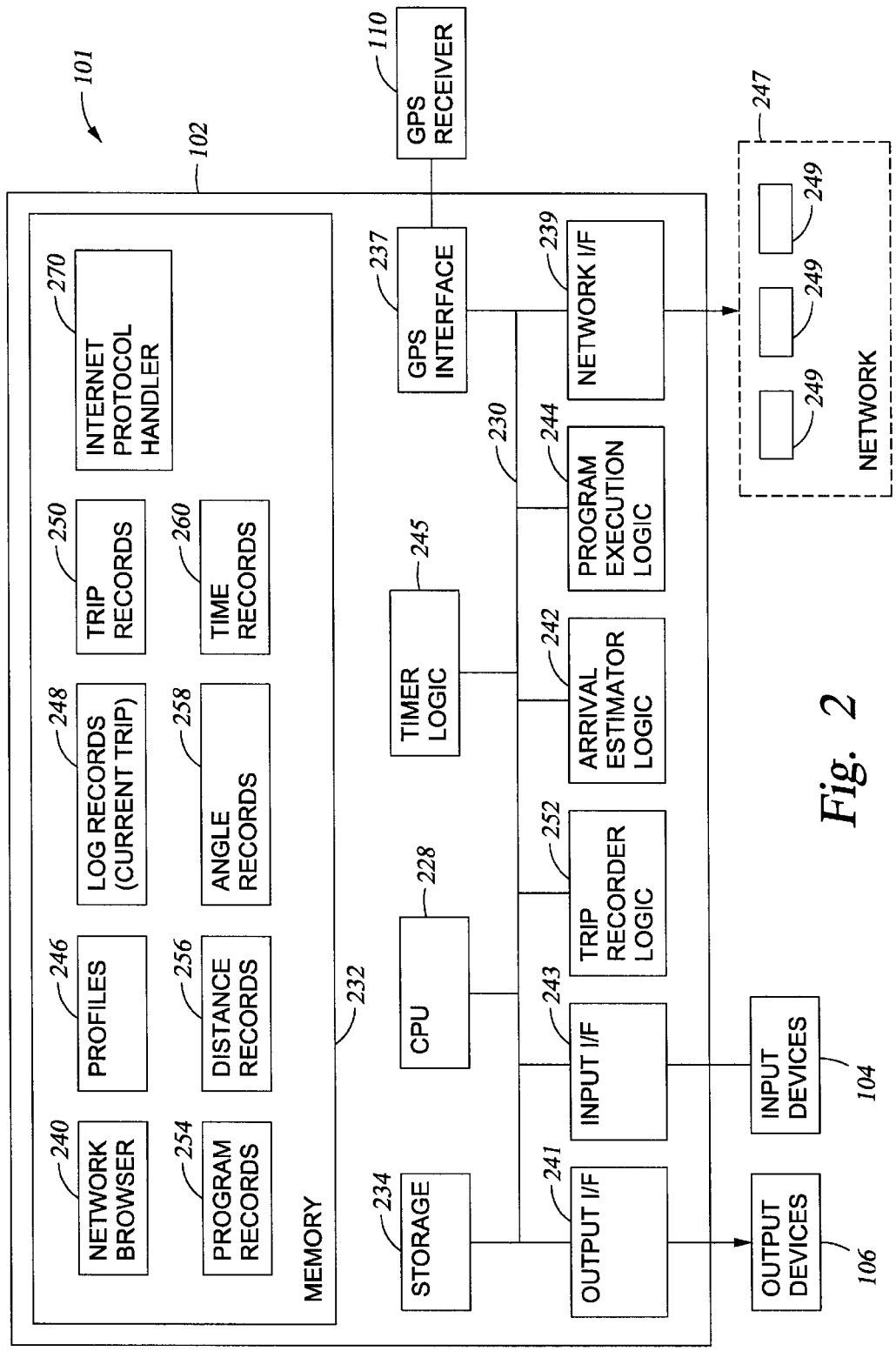
FIG. 2 is a high level schematic diagram of a computer system.

FIG. 2 depicts an embodiment of the data processing system 102. In general, the data processing system 102 includes a Central Processing Unit (CPU) 228 connected, via a bus 230, to a memory 232, storage 234, input devices 104 and output devices 106. In addition, the data processing system 102 includes various interfaces to support data communications between peripheral devices, such as the input devices 104, output devices 106, the GPS receiver 110 and remote inter network devices. Accordingly, an output interface 241 and in input interface 243 operate as exit/entry devices for the output devices 106 and the input devices 104, respectively. A receiver interface 237 connects the GPS receiver 110 to the data processing system 102. Further, a network interface 239 provides a wireless connection between the data processing unit 102 and a network 247 comprising a plurality of computers 249. In one embodiment, the network 247 is the Internet.

The system 101 also includes logic configured for performing steps described in detail below. In one embodiment, the logic includes arrival estimator logic 242 (also referred to herein as the "arrival estimator 242"), program execution logic 244, trip recorder logic 252 (also referred to herein as the "trip recorder 252"). In general, the arrival estimator 242 operates to calculate an estimated time to arrival (ETA). The ETA is then used to determine the appropriate signals to provide to the output devices 106 according to user selected configuration information. The signals are provided by the program execution logic 244 which is configured to access and execute data structures containing the signal information. The logical components shown in FIG. 2 are merely illustrative and may be software, hardware or a combination thereof. In the case of software, the logic can be contained in storage 234 and loaded into memory 232 as is necessary.

Storage 234 is preferably a Direct Access Storage Device (DASD), although it is shown as a single unit, it could be a combination of fixed and/or removable storage devices, such as fixed disc drives, floppy disc drives, tape drives, removable memory cards, or optical storage. Memory 232 and storage 234 could be part of one virtual address space spanning multiple primary and secondary storage devices.

Memory 232 is preferably random access memory sufficiently large to hold the necessary programming and data structures of the invention. In the embodiment shown, memory 232 contains a browser program 240, a programming profiles data structure 246, a log records data structure 248, a trip records data structure 250, a program records data structure 254, a distance records data structure 256, an angle records 258 data structure, a time records data structure 260 and an Internet protocols handler 270. Illustratively, the program structures and data structures are contained in the memory 232, but may be contained in any memory device, either locally on the system 101 or remotely (e.g., on the on the computers 249). While memory 232 is shown as a single entity, it should be understood that memory 232 may in fact comprise a plurality of modules, and that memory 232 may exist at multiple levels, from high speed registers and caches to lower speed but larger DRAM chips.

When executed on CPU 228, the browser program 240 provides support for navigating the network 247 and locating information at one or more of the computer 249. In one embodiment, the browser program 240 is a web-based browser and the computers 249 are web servers. Although only one browser is shown residing in memory 232, the invention contemplates using any number of browsers, each of which may be of the same or of varying types. One browser which may be used to advantage is Netscape®, provided by Netscape Communications of Mountain View, Calif.

The Internet protocols handler 270 provides software that supports data transmission to and from the Internet. For example, the Internet protocols handler 270 may include client software to allow transmissions by File Transfer Protocol (FTP), a well-known file transfer capability that is often used on TCP/IP networks. Accordingly, the network interface 239 may be configured for FTP data communications. An Internet protocols handler 270 configured for FTP is merely illustrative and other embodiments are configured for any known and unknown protocols.

Figures 3, 4:
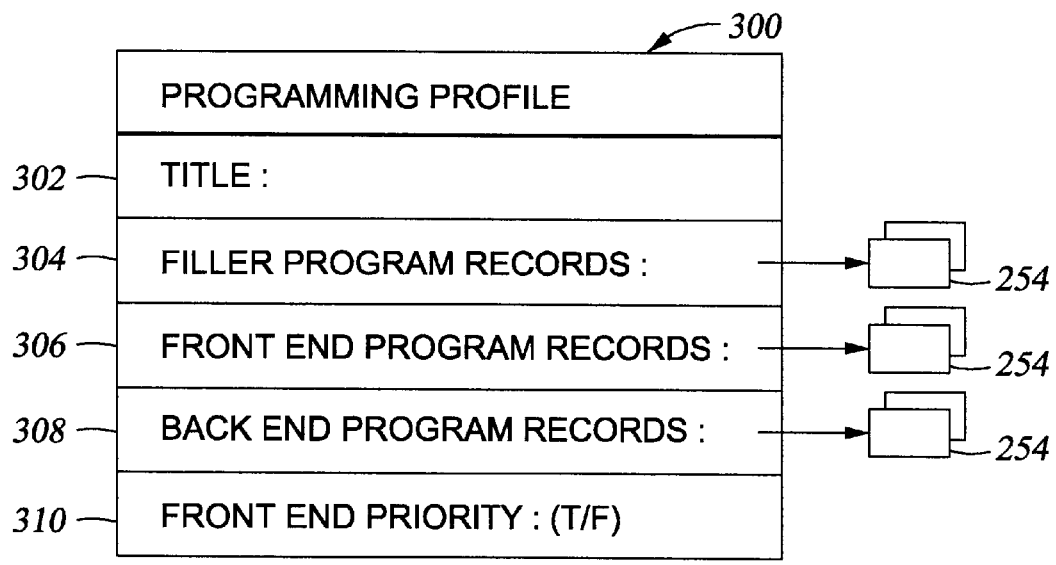
FIG. 3 is an illustrative programming profile data structure.
FIG. 4 is an illustrative program record data structure.

In general, the programming profiles data structure 246 contains user configurable programming information (stored as a plurality of records) utilized to determine the signals output by the output devices 106 during operation of the vehicle 100. One embodiment of a profile record 300 contained in the programming profiles data structure 246 is shown in FIG. 3. A first field 302 of the data structure 246 contains title information. The title information provides convenient means of identifying the particular programming profile record and may be established by the user of the system 101. The fields 304, 306, and 308 contain pointers to program records which may be executed during a given trip. The program records are arranged in an order of preferred execution (as determined by the user, for example). A second field 304 contains pointers to program records which are retrieved when "filler" output material is needed (e.g., during a time period in which the user has not selected specific programming). An illustrative program record is described below with reference to FIG. 4. A third field 306 contains pointers to program records to be accessed and executed during a front end portion of a programming schedule. A fourth field 308 contains pointers to program records for a back end portion of a programming schedule. As will be described below, provision of the front end and back and program records provide a user with additional flexibility in determining a programming schedule. A fifth field 310 contains a flag value indicating whether a user has elected to give priority to the front end program records or the back end program records.

One embodiment of a program record 400 contained in program record data structure 254 is shown in FIG. 4. In general, a plurality of program records are contained on the system 101, wherein each record contains program information to be output by the output devices 106. A first field 402 of the program record 400 contains title information that identifies the particular program record 400. A second field 404 contains source information identifying the address at which the program information is located. For example, field 404 may contain a network address, such as a uniform resource locator (URL) of a web site located on one of the computers 249. More generally, the address may be for any location on any device from which information may be retrieved and executed by the system 101. Illustrative devices on which the program information may reside include compact disk (CD) players, MiniDisc players, radios, cassette players, network devices (e.g., the computers 249), voicemail and email devices, and the like. Further, the program information may be non-executable data such as music, news, etc., or may be executable data which, when executed, causes a system (e.g., system 101) to perform certain functions. Such functions include, for example, operating (e.g., for a predetermined period of time) a massaging device disposed in a car seat of the vehicle 100, adjusting the position of a car seat, etc. In general, the executable data may be configured to operate any component of the vehicle or even other components such as an electric garage door opener. Additionally, it is understood that the invention is not limited to particular program information or signal types, but may include any known and unknown information-carrying signals and any protocols to support transmission of the signals.

A third field 406 contains a local address of the program information, if available. A locally resident copy of the program information can facilitate operation of the system 101 by, for example, avoiding the need to establish a network connection in order to retrieve the program information.

In addition, the program record data structure 400 may contain timing information pertaining to the playback timing and duration of the program information. Such information is contained in a fourth field 408 and a fifth field 410. The fourth field 408 contains the typical duration of the program information. For example, a daily weather report on a particular radio station may typically last five (5) minutes. A fifth field 410 contains the current actual duration of the program information which represents the actual length of the program information to be executed during the given trip. It is understood that the information contained in the fifth field 410 is typically only relevant to prerecorded "dynamic" information, i.e., a daily radio program, which may vary in length from day to day. For "static" information, such as a song contained on a CD, the typical duration and actual duration are always the same. Further, the fifth field 410 is empty until a programming profile record 300 pointing to particular program records is initialized for a particular trip. At that time, the system 101 may access the source addresses (contained in the second field 404) and determine the duration of the program information.

In general, the program records 400 are used to determine the operation and output of output devices 106. In one embodiment, the program records 400 are executed sequentially according to the position of the system 101. In another embodiment, the program records 400 may be configured for execution according to a predetermined period of time. Still other embodiments may provide for simultaneous execution of two or more program records. Execution for a predetermined period of time and/or simultaneous execution may be particularly desirable, for example, for the operation of devices described above, such as a seat massaging or adjustment mechanism, a garage door opener, and the like. Such operation of these devices can generally be described as zero-time events, i.e., they are executed with regard to the position of the system 101 but need not be periodically monitored for changes in the position of the system 101. In such cases, the program record 400 may include additional fields. For example, a "zero-time identifier" field may be provided to include a flag or other value to differentiate a zero-time record from other records. In addition, an "execution check" field may be provided to periodically determine whether the program record has been executed. Further, the zero-time records may include an ETA value or elapsed time value which can be used to determine the desired execution time according to steps described below. Persons skilled in the art will recognize other embodiments adapted to support simultaneous execution and/or execution for a predetermined period of time.

In operation, the program execution logic 244 (shown in FIG. 2) is configured to selectively retrieve program information (e.g., signal source, play time, and other preferences) contained in the programming profiles data structure 246. The determination of which programming profiles data structure 246 to access is made according to information contained in a trip records data structure 250. Further, the arrival estimator 242 is used to determine an estimated time to arrival (ETA) to a known destination point and the timer logic 245 is used to determine the time elapsed from the origination point. The ETA and/or the elapsed time is then used by the program execution logic 244 make any necessary adjustments to the signals being output according to settings information contained in the programming profiles data structure 246.

The trip recorder 252 is configured to gather log records (i.e., trip data) during a given trip. Log records may include data pertaining to speed, position, distance and the like. The log records data structure 248 provides a temporary buffer space for the log records. At the end of the trip, a user may elect to discard the log records or store the records to a persistent memory area (e.g., storage 234) for future use. When stored for future use, the log records become trip records contained in the trip records data structure 250. The trip records can then be used to make determinations about the ETA, for example. An illustrative log record is described below with reference to FIG. 9.

Figure 5:
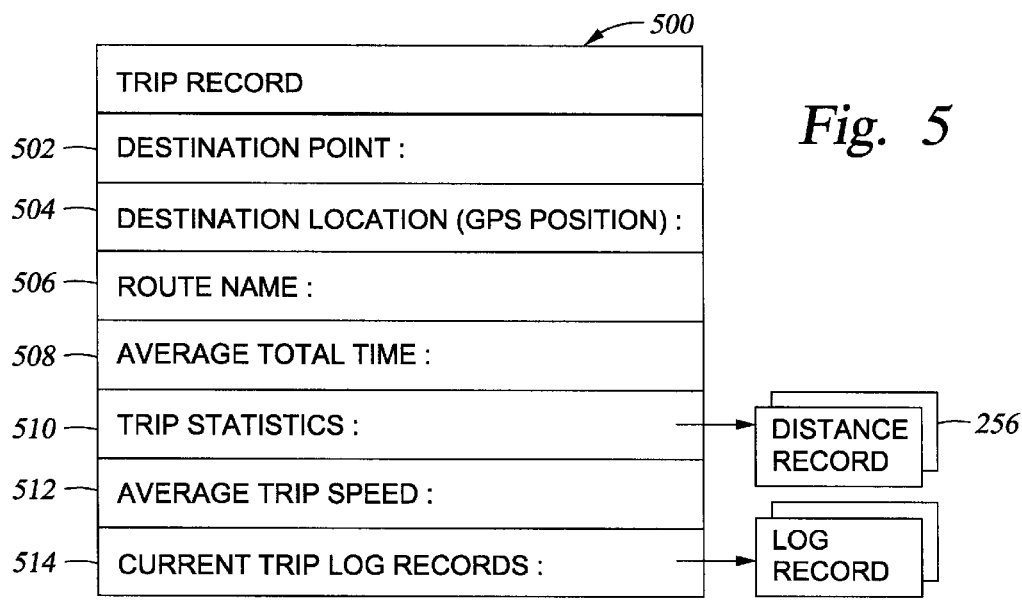
FIG. 5 is an illustrative trip record data structure.

One embodiment of a trip record 500 (contained in the trip records data structure 250) is shown in FIG. 5. In general, the trip record 500 contains destination information, route information, trip statistics and the like. In one embodiment, a trip record 500 is created upon completion of a trip. That is, the system 101 is configured to collect data during operation of the vehicle 100 from origination point to a destination point. The collected data is then used to create a trip record 500 for the route traveled. In another embodiment, the trip records 500 are created separately from the system 101 (e.g., by a mapping service) and then loaded onto the system 101. In the latter embodiment, the system 101 may download (e.g., from the mapping service) only the trip records necessary for a particular trip. The trip records may subsequently be discarded upon completion of the trip. In this manner, the memory needed to store trip records is minimized.

A first field 502 of the trip record 500 contains a generic name for the destination point and may be selected by the user. A second field 504 contains the GPS location of the destination point. A third field 506 contains a route name and is also user selectable. Accordingly, a user may generate two or more trip records for a given travel path (i.e., a particular destination point traveled to along a particular route) which are made distinct by different route names. A fourth field 508, contains an average total time value for the travel path of the trip record 250. A fifth field 510, contains trip statistics. Illustratively, the trip statistics are referenced by pointers to a plurality of distance records which, in turn, point to a plurality of angle records. The angle records, in turn, point to time records. Embodiments of distance records, angle records and time records will be described below with reference to FIGS. 6–8. The average trip speed is recorded in a sixth field 512. The trip record 500 also includes a seventh field 514 containing pointers to log records (contained in the log records data structure 248). An embodiment of a log record is shown in FIG. 9 described below.

Figure 6:
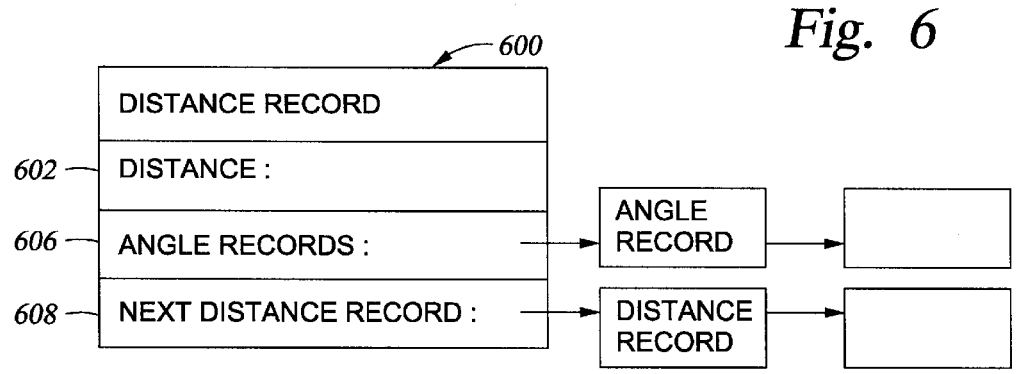
FIG. 6 is an illustrative distance record data structure.

One embodiment of a distance record 600 is shown in FIG. 6. In general, distance records 600 are generated periodically during a trip and selectively stored to persistent memory (e.g., storage 234) upon completion of the trip. The number of distance records 600 contained in the distance record data structure 256 and the units of measurement used may vary according to application. Illustratively, a distance record may exist for every tenth of a mile traveled. The calculated distance value to be stored to the distance records 600 is a straight line measurement from a current GPS location to the GPS location of the destination point. A schematic representation of how a distance value (D) is determined is shown in FIG. 10 described below. The distance value is stored in a first field 602 of the distance record 600. A third field 606, contains pointers to angle records. Each distance record 600 may contain pointers to multiple angle records. An exemplary angle record is described below with reference to FIG. 7. A fourth field 608, contains a pointer to the subsequent distance record. Accordingly, the distance records collectively comprise a linked list.

Figure 7:
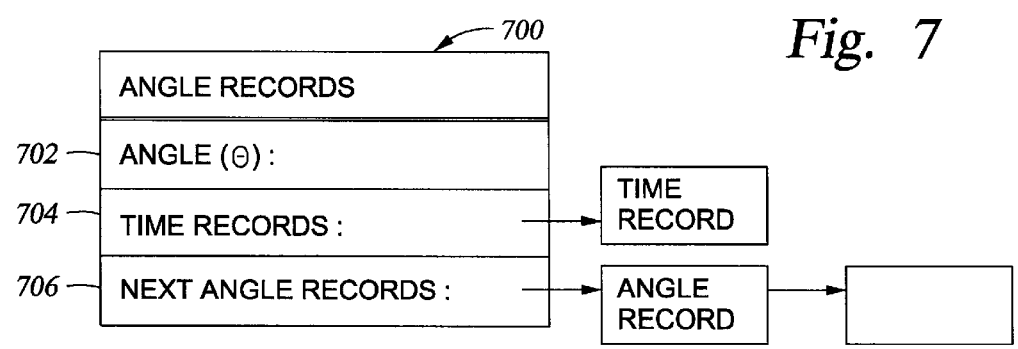
FIG. 7 is an illustrative angle record data structure.

One embodiment of angle record 700 is shown in FIG. 7. The number of angle records contained in the data structure 258 and the units of measurement may vary according to application. Illustratively, an angle record may be created for every ten degrees traveled. A first field 702 of the angle record 700, contains an angle value. The angle value is calculated with reference to a GPS location of the destination, a GPS location of the system 101 and an axis of a grid. A schematic representation of an angle value (θ) is shown in FIG. 10 described below. A second field 704 contains a pointer to a time record contained in the time record data structure 260. An illustrative time record data structure 260 is described below with reference to FIG. 8. A third field 706 contains a pointer to the next angle record. Accordingly, the angle records collectively comprise a linked list of records.

Figures 8, 9, 10:
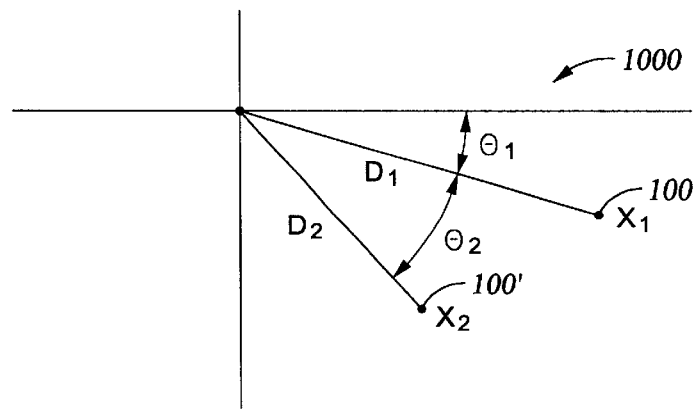
FIG. 8 is an time record data structure.
FIG. 9 is an illustrative log record data structure.
FIG. 10 is an illustrative coordinate system using angle and distance values relative to a destination point.

One embodiment of a time record 800 (contained in the time record data structure 260) is shown in FIG. 8. Illustratively, time records are kept for 20 minute intervals. The beginning of the time interval is contained in a header field 802. Thus, the time record 800 shown in FIG. 8 represents the record for the time interval between 8:00 AM and 8:19 AM, inclusive. The remaining portion of the record 800 is structured as a plurality of columns and rows. A first column 804 contains descriptors for each row 812a–h. The row descriptors include "Average" for row 812a and a descriptor identifying each day of the week for rows 812b–h. A second column 806 contains average time values for a plurality of the rows and a third column 808 contains count values for a plurality of the rows. The average time value contained in column 806, row 812a represents the average time needed to travel to the destination point from a given position (distance and angle) during that time of day (e.g., between 8:00 AM and 8:19 AM). The average time values contained in column 806, rows 812b–h represent the average time needed to travel to the destination point from a given position (distance and angle) on that day of the week within the given time interval (e.g., between 8:00 AM and 8:19 AM). A fourth column 810 contains travel pattern correlation information that references secondary information when primary information is not available. In the embodiment depicted in FIG. 8, the travel pattern correlation information represents average values for similar days of the week when a value for a particular day is unavailable. For example, a typical work week includes the days Monday through Friday. Thus, Tuesday through Friday constitute similar days relative to Monday. Accordingly, values collected for Tuesday through Friday may be used for trip calculations on a Monday in the event values particular to Monday are not available.

Some of the fields contained in FIG. 8 are not utilized. Such fields are indicated by null values (Ø).

As described above, the distance records 600, the angle record 700 and in the time records 800 are preferably created or modified upon completion of a trip. In one embodiment, the information used to populate the records is temporarily stored in log records during the duration of the trip. The log records are contained in the log record data structure 248. One embodiment of the log record 900 is shown in FIG. 9. A first field 902 of the log record 900 contains positional information. For a trip in which the GPS location of the destination is known, the position information includes a distance value and an angle value, determined with respect to the destination location. If the GPS location of the destination is not known, the postitional information comprises the current GPS location of the vehicle 100 when the log record is created. The current GPS location is later used to determine a corresponding angle and distance value relative to the GPS location of the destination. A system for determining the distance and the angle values is described below with reference to FIG. 10. A second field 904 contains the day of the week. A third field 906 contains the time of day. A fourth field 908 contains the average speed, which is determined with respect to the previously created log record.

The frequency with which log records 900 are created may vary according to application. Illustratively, a log record 900 may be created for every tenth of a mile traveled and/or every ten degrees traveled.

In one embodiment, a two-dimensional coordinate system is used to determine positional information of the vehicle 100 (FIG. 1) for purposes of calculating or otherwise determining an ETA to a destination. FIG. 10 shows an illustrative coordinate system 1000 in which each coordinate is given by a distance, D, and an angle, θ. A vehicle 100 is shown at an first position (origination point), given by X1, and is traveling toward a destination point (the origin of the coordinate system). The coordinates for X1 are D1 and θ1. A second position X2 of the vehicle 100', on route to the destination point, has the coordinates D2 and θ2. During the course of travel, the system 101 (FIG. 1) gathers positional information (i.e., distance values and angle values) as well as additional information such as speed, average time to travel a given distance and the like. The collected positional information is initially stored as log records 900 in the log record data structure 248 and is then selectively stored to records in the distance record data structure 256 and the angle record data structure 258, as is appropriate, for future use. The collection and use of the information will be described in greater detail below.

The coordinate system described and referenced herein is utilized to determine an ETA to the destination point under circumstances described below. However, the system is merely illustrative and the invention is not limited to a particular system. Those skilled in the art will recognize that any method or system may be used to advantage.

Figure 11A:
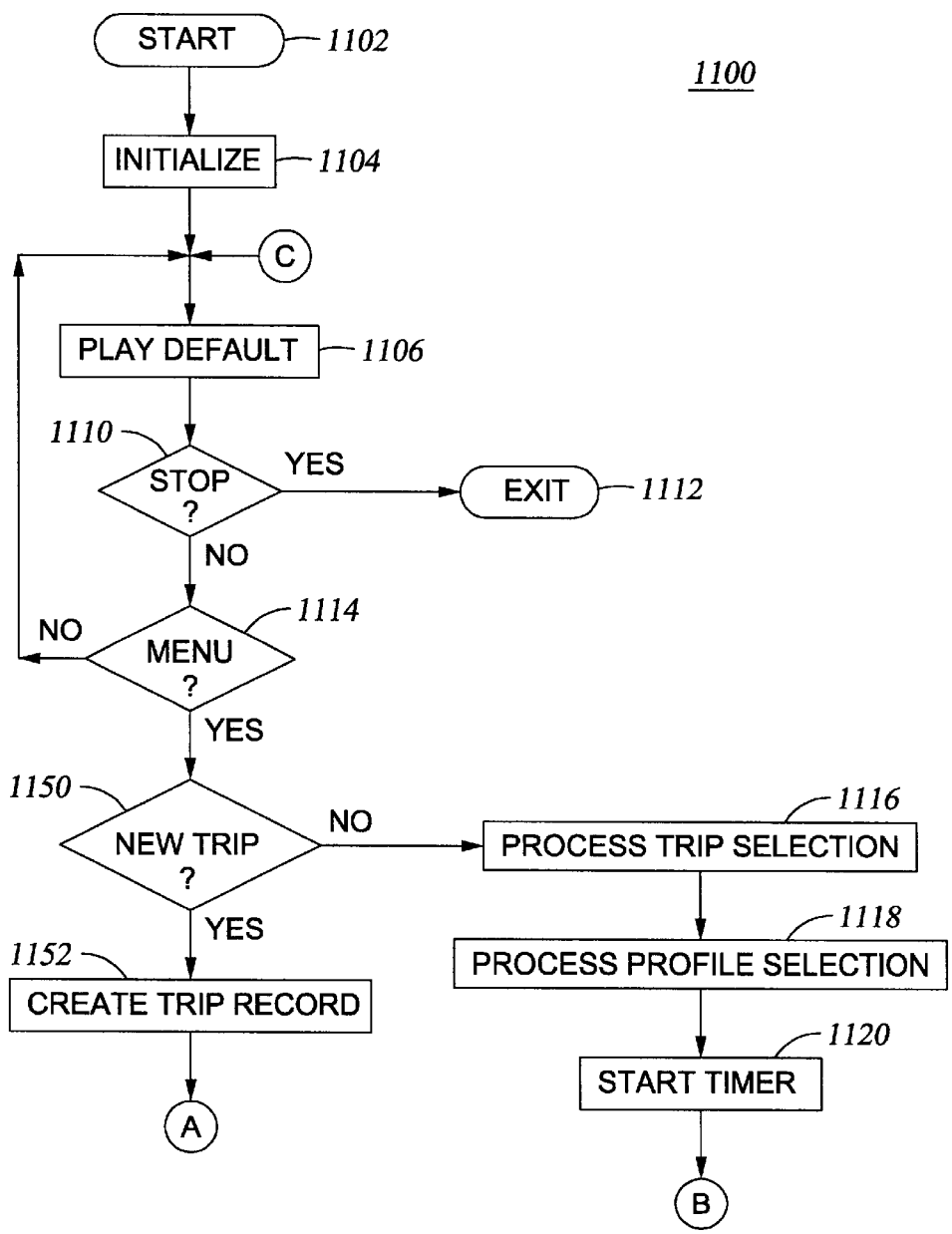
FIG. 11 is a flow diagram illustrating a method of operating a vehicular computer system configured to determine output according to time values.
Figure 11B:
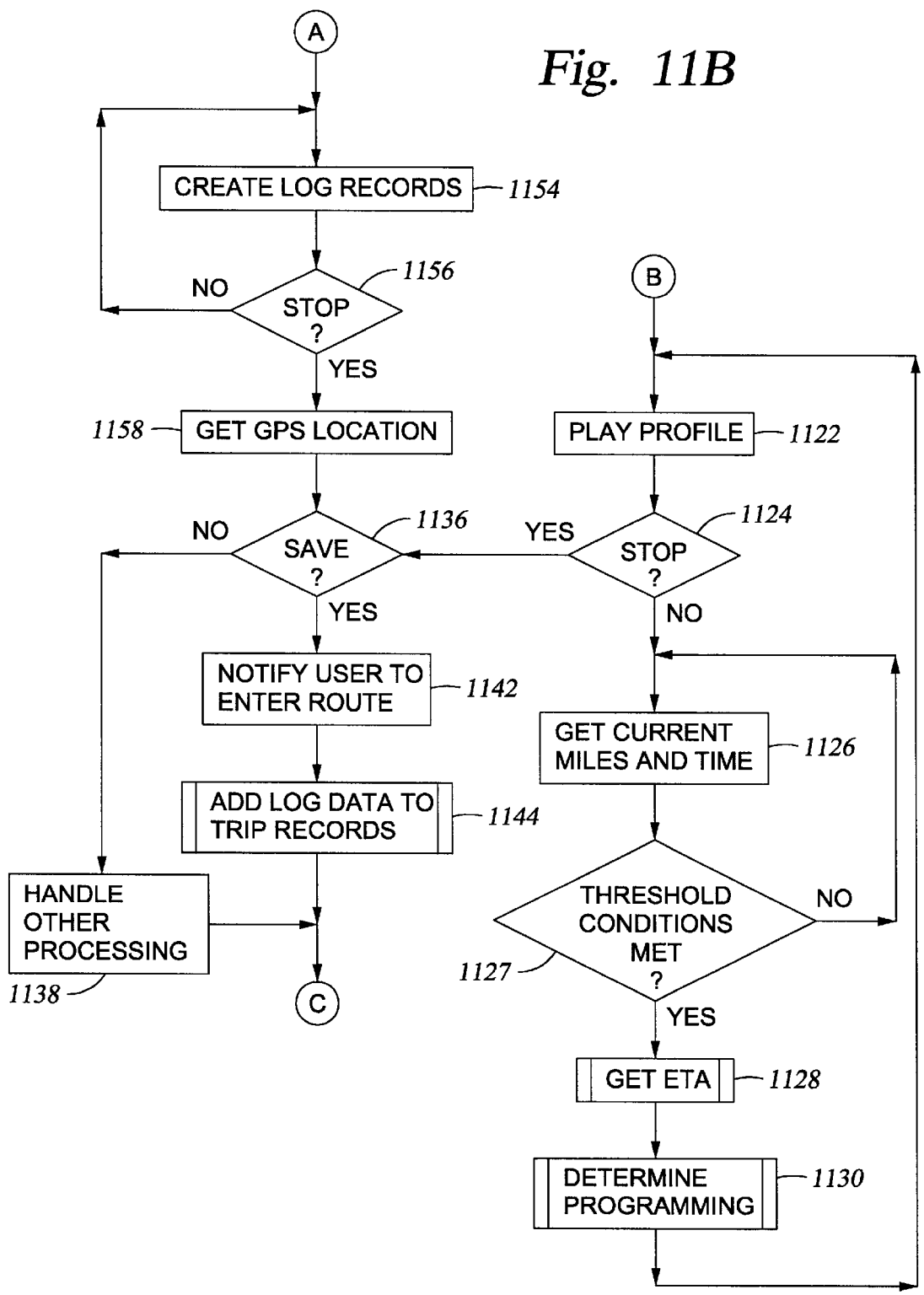

FIG. 11 shows a flow diagram for a method 1100 of operating the on-board computer system 101 disposed in the vehicle 100 (see FIG. 1). The method 1100 is entered at step 1102 which may occur, for example, when an operator starts the vehicle 100. The system 101 is then initialized at step 1104. Initialization may include loading configuration and user-preferences information into memory 232. At step 1106, default settings are executed to provide default signals from the output devices 106. Default setting may be established, for example, according to default data contained in a program record 400. Alternatively, a default setting may cause the system 101 to output signals according to the system configuration at the time of the previous shut-down.

During its operation, the system 101 receives and processes a plurality of events. The events may be user-issued commands (received by the input devices 104) or may represent determinations made by the system 101. At step 1110, the method 1100 determines whether a termination event is received. A termination event may occur, for example, when the destination point is reached or when the system 101 is powered down (i.e., turned off). If step 1110 is answered affirmatively, the method 1100 exits at step 1112. If step 1110 is answered negatively, method 1100 proceeds to step 1114.

At step 1114, the method 1100 queries whether a user-issued menu selection on a control menu to configure the operation of the system 101 has been received. If not, the method 1100 returns to step 1106, thereby maintaining the default settings.

If step 1114 is answered affirmatively, the method 1100 proceeds to step 1150 and queries whether the menu selection is to indicate a new trip, i.e., one for which a trip record 500 does not exist. If so, a new trip to record 500 is created at step 1152 and the vehicle operator may input a destination point descriptor (in the first field 502 of the trip record 500) and a route name descriptor (in a third field 506 of the trip record 500). At step 1154, the trip recorder 252 begins creating log records 900 during the course of travel. At step 1156, the method 1100 queries whether the system 101 has received a termination event. In one embodiment, a termination event is a user-issued command indicating that the destination point has been reached. If a termination event has not been received, method 1100 returns to step 1154, otherwise method 1100 proceeds to step 1158. At step 1158, the system 101 gets a GPS location of the destination point using the GPS receiver 110 and then stores the GPS location into the second field 504 of the trip record 500.

If step 1150 is answered negatively, method 1100 begins processing user programming selections. At step 1116, the system 101 receives and parses a trip selection. A trip selection is made by allowing the vehicle operator to access and select an appropriate trip record 500. In one embodiment, the vehicle operator selects the trip record 500 by inputting to the system 101 the desired destination point and route name. The system 101 then searches the available trip records and locates a matching record. In another embodiment, the available trip records 500 may be displayed to vehicle operator on an output device 106, such as a display screen. Selection is then made by highlighting the desired trip record 500 on the display screen.

At step 1118, the system 101 receives and parses a profile selection. In one embodiment, the selection at step 1118 is made automatically by the system 101 according to a default setting contained in the selected trip record 500. In another embodiment, profile selection is made by allowing the vehicle operator to select one or more existing programming profile records 300 or create new programming profile records 300. Selection of an existing record 300 may be accomplished by allowing the vehicle operator to input the title of the record into the system 101 via the input devices 104. The system 101 then searches the program profiles data structure 246 for a record having matching title information contained in the first field 302 of the record 300 (as shown in FIG. 3). Alternatively, the vehicle operator may view the available programming profile records 300 on a display screen.

At step 1120, a timer is initiated. As will be described below, the timer is utilized in some embodiments to insure that the appropriate program record 400 is being executed according to the information contained in the selected programming profile record 300. Execution of the program record 400 begins at step 1122.

At step 1124, the method 1100 queries whether a termination event is received. A termination event includes, for example, a user-issued command or arrival at the destination point. If step 1124 is answered negatively, the method 1100 proceeds to step 1126 to get the current miles traveled and travel time (provided by the timer initiated at step 1120). At step 1127, the method 1100 queries whether a predetermined threshold condition is satisfied. The threshold condition is selected to allow reiteration of portions of method 1100 without creating excessive data (e.g., log records). In one embodiment, the threshold condition is a function of mileage and/or time. For example, the threshold condition may be that the vehicle 100 travel one-tenth (1/10) of a mile and/or that 30 seconds have elapsed. If the threshold condition has not been satisfied, the method 1100 returns to step 1126.

If the threshold condition has been satisfied, the method proceeds to step 1128 where the information gathered at step 1126 is used to determine an ETA. One embodiment of a method for determining the ETA is described below with reference to FIG. 12.

At step 1130, a determination of the current programming selection is made. That is, the system 101 determines which program record 400 should be executed according to the currently selected programming profile record 300. One embodiment of a method for step 1130 is described below with reference to FIG. 13. The method 1300 then returns to step 1122 to execute the appropriate program record.

Returning again to step 1124, if the query is answered affirmatively, the method 1100 proceeds to step 1136 queries whether the event being processed includes a command to save the trip information contained in the log records 900. If not, the event is handled at step 1138 and the method 1100 then exits at step 1140.

If the event at step 1136 is a command to save the trip information, the system 101 issues a request to the vehicle operator (at step 1142) for a route name (to be stored to the third field 506 of the trip record 500). Preferably, the system 101 displays the current route name (entered at step 1152 in the case of a new trip record 500) as the default entry. In the case of a new trip record 500, the vehicle operator may simply select the default route name. In the case of a previously existing trip record 500, the vehicle operator may also select the default route name, in which case the data contained in the log records 900 is used to update the record 500. However, in some cases it may be desirable to create a separate record even though a trip record 500 exists, such as when the trip information is atypical for the particular travel path (due to road construction, for example).

At step 1144, the data contained in the log records 900 is stored to the appropriate trip record 500. One embodiment of a method for step 1144 is described below with reference to FIG. 14. The method 1100 then returns to step 1106.

It should be noted that a user may interrupt a trip with one or more stops before reaching the destination point. Thus, in an alternative embodiment, the termination event at step 1124 may also include intermittent stops on route to the destination. In such a case, the user may save each trip segment (at step 1136) and later, upon reaching the destination point, combine the stored trip segments information to create a single trip record for the entire trip.

Figure 12:
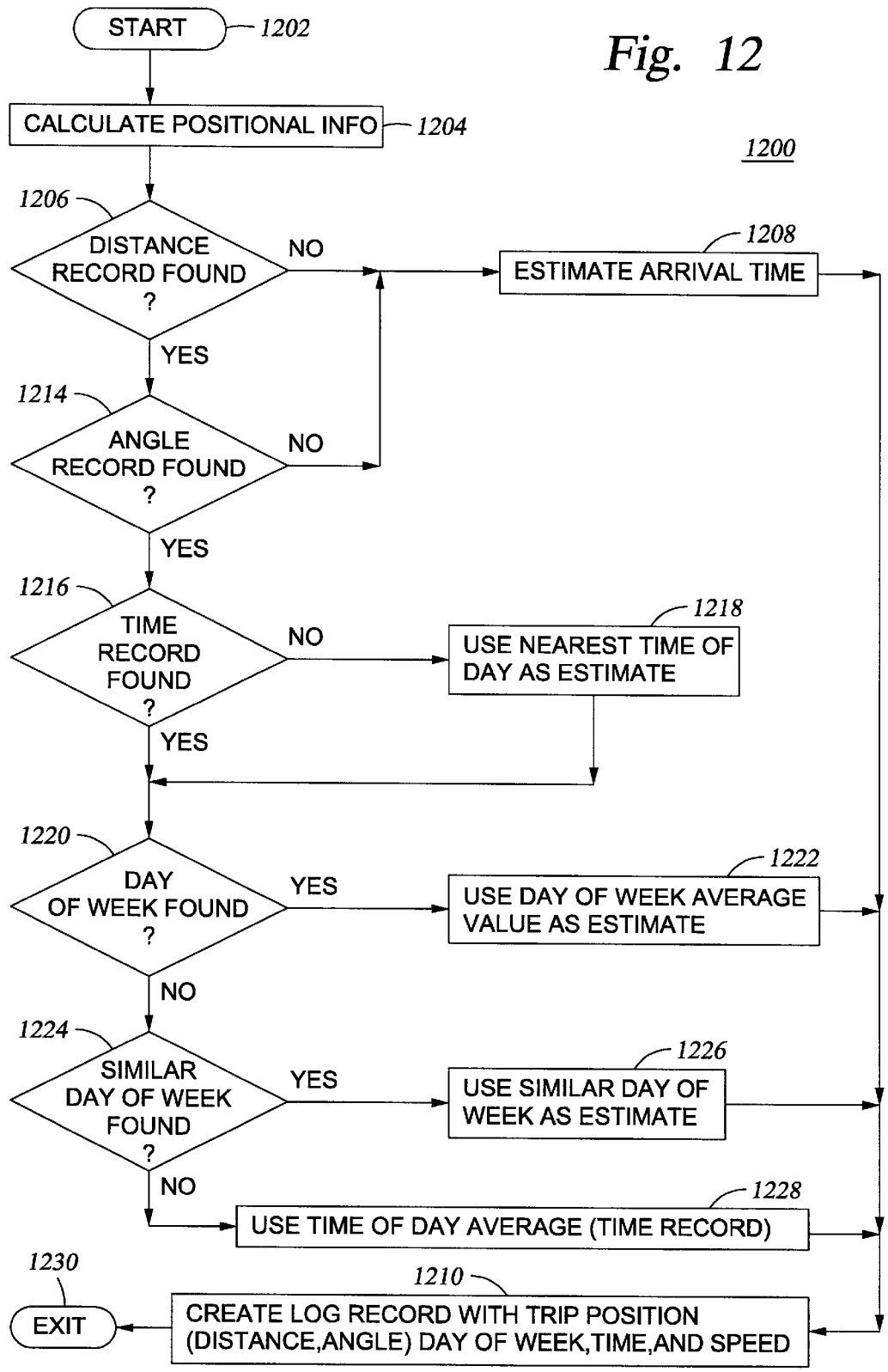
FIG. 12 is a flow diagram illustrating a method of determining an arrival time.

FIG. 12 shows a method 1200 for calculating the ETA at step 1128 of FIG. 11. The method 1200 is entered at step 1202 and then proceeds to step 1204 to calculate positional information of the vehicle 100 relative to the destination point. That is, the distance to the destination point (referred to herein as the "current distance value") and the angle relative to the destination point (referred to herein as the "current angle value") are calculated. The current distance value calculation at step 1204 is a straight line measurement of the distance between the current GPS location of the vehicle 100 and the GPS location of the destination point (contained in the second field 504 of the trip record 500).

In one embodiment, the current distance value calculated at step 1204 is rounded off according to a graduated scale. Illustratively, current distance values are rounded according to the following scheme:

| DISTANCE VALUE (in miles): | ROUND TO: |
|---|---|
| between zero (0) and two (2) | nearest one tenth mile (0.1) |
| between two (2) and five (5) | nearest two tenths mile (0.2) |
| between five (5) and twenty (20) | nearest half mile (0.5) |
| greater than twenty (20) miles | nearest mile (1.0) |

At step 1206, the method 1200 queries whether a distance record 600 containing a distance value (in the first field 602) matching the current distance value calculated at step 1204 can be located. Only those distance records 600 associated with the current trip record 500 are processed to determine matching information. Accordingly, step 1206 is accomplished by accessing the distance records 600 pointed to by the pointers contained in field 510 of the trip record 500.

If a matching distance record is not located at step 1206, the method 1200 proceeds to step 1208 where the ETA is estimated without the benefit of historical information. In one embodiment, the ETA is estimated according to:

$$ETA=2*(Distance)/(Average\ Speed). \qquad \text{Equation 1}$$

Method 1200 then proceeds to step 1210 where a log record 900 for the current trip position is created by the trip recorder 252. Method 1200 then exits at step 1230 and proceeds to step 1130 (FIG. 11).

If a matching distance recorded 600 is located at step 1206, the method 1200 proceeds to step 1214 to determine whether a matching angle record 700 can be located for the current trip record 500. Accordingly, each of the angle records 700 pointed to by the pointers contained in field 606 of the matching distance records 600 is accessed and processed. Specifically, the values contained in the first field 702 of the angle record 700 are compared to the current angle value calculated at step 1204. In one embodiment, the angle values contained in the records 700 and the current angle value are rounded to the nearest 10 degrees. If a matching record 700 is not found, the method 1200 proceeds to step 1208 to calculate the ETA according to Equation 1 described above. Method 1200 then proceeds to step 1210 and then exits at step 1230 and proceeds to step 1130 (FIG. 11).

If a matching record 700 is found, method 1200 proceeds to step 1216 to determine whether a time record 800 exists for the current time. As described above, time records are preferably kept for intervals of time, e.g., twenty minutes intervals. For example, the illustrative time record 800 described with reference to FIG. 8 is for the time interval between 8:00 AM and 8:19 AM, inclusive. Accordingly, if the current time is 8:15 AM, then at step 1216, the method determines whether a time record 800 for the time interval 8:00 AM to 8:19 AM exists.

Is a time record for the current time is not found at step 1216, the method 1200 proceeds to step 1218 to retrieve the time record 800 with the closest time interval. For example, if the current time is 8:15 AM, the time record 800 for the time interval 8:20 AM to 8:39 AM (inclusive) is retrieved, if such a record exists.

If a time record 800 for the current time is located at step 1216, or the next closest time record 800 is located at step 1218, the method 1200 proceeds to step 1220. The method 1200 then queries whether an entry exists in the record 800 for the current day of the week. In particular, step 1220 determines whether an average value is contained in column 806 of the time record 800 for the current day. If an average value exists, the value is passed to the program execution logic 244 for use in determining the current programming (described below with reference to FIG. 13). The method 1200 then proceeds to step 1210 and continues processing in the manner described above.

If step 1220 is answered negatively, the method 1200 proceeds to step 1224 to determine whether travel pattern correlation information is available. Specifically, a determination is made as to whether an average value is contained in column 810 of the time record 800 for the current day. If an average value exists, the method 1200 proceeds to step 1226 where the average value is passed to the program execution logic 244 as the ETA for use in determining the programming at the current time.

If step 1224 is answered negatively, the method 1200 proceeds to step 1228 where the total average value (i.e., the value contained in column 806 of row 812a) is passed to the program execution logic 244 as the ETA for use in determining the programming at the current time. The method 1200 then proceeds to step 1210 and continues processing in the manner described above.

FIG. 12 is merely illustrative and persons skilled in the art will recognize additional or alternative methods for determining an ETA. For example, in one embodiment, current traffic patterns may be used in calculating the ETA. Thus, if a congested area within the current route is identified, the ETA may be adjusted accordingly.

Figure 13:
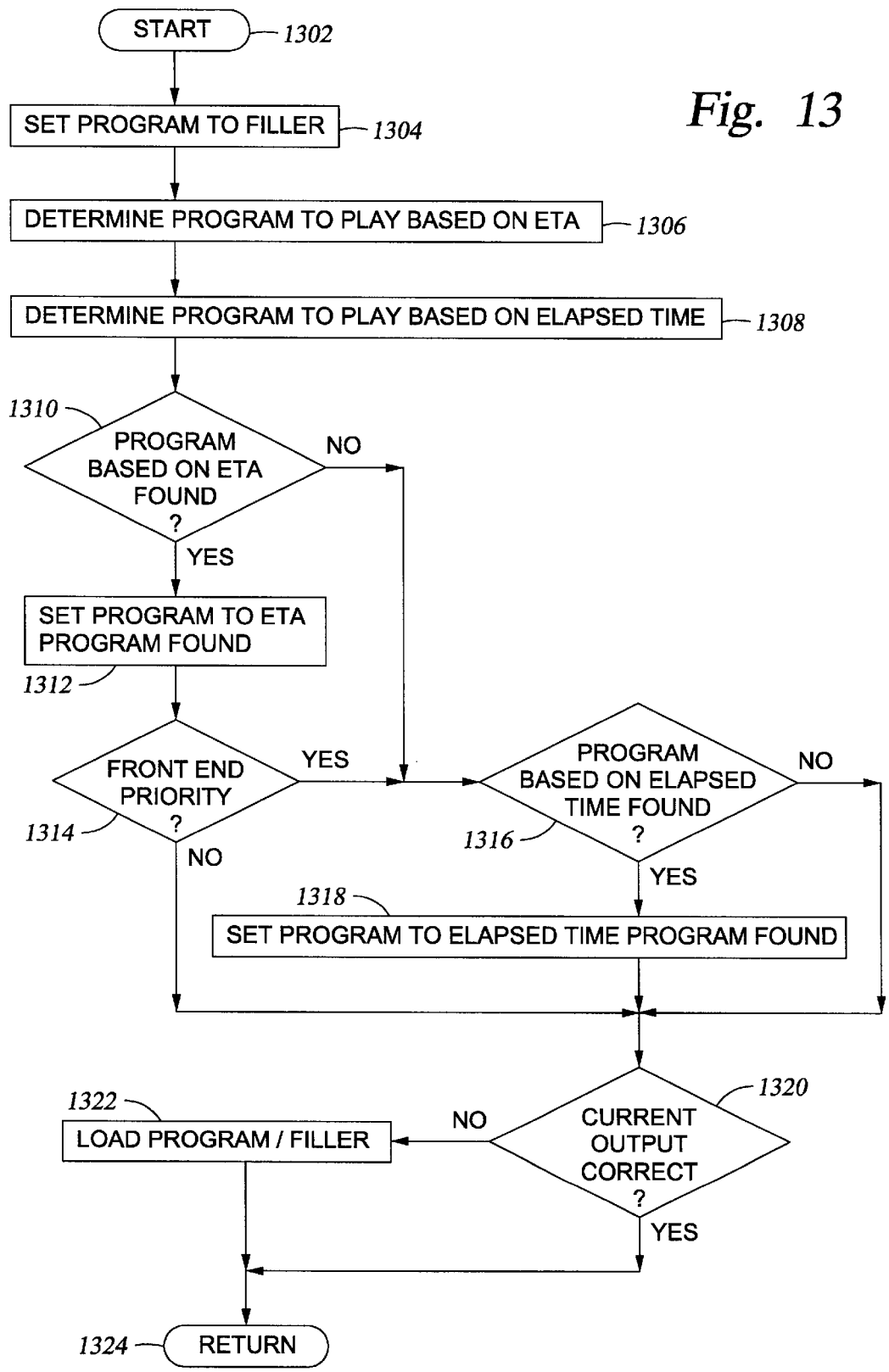
FIG. 13 is a flow diagram illustrating a method of determining program execution during a trip.

FIG. 13 shows a method 1300 for determining the programming (step 1130 of FIG. 11) for the current time. The method 1300 is entered at step 1302 and proceeds to step 1304 where, by default, the program information to be executed is set to the filler program information. Illustratively, a value is set in memory 232 indicating the filler program information to be executed. The filler program information is contained in a filler program record as indicated by the pointers contained in the second field 304 of the programming profile record 300. The method 1300 then proceeds to determine whether the currently selected profile indicates that the program to be executed is other than the default filler program record(s).

At step 1306, method 1300 the current programming is determined according to the ETA provided by method 1200 described above. Specifically, the ETA is correlated to a back end program record, i.e., the program records 400 pointed to by the pointers contained in field 308 of the programming profile record 300, or to a filler record. As described above with reference to FIG. 3, the field 308 contains an ordered list of pointers to specific program records 400. Each record 400 includes a field 410 containing the execution time for the program information associated with the record 400. Beginning with the last record of the list, the time values contained in field 410 are added until the resulting sum equals or exceeds the ETA. The program record 400 associated with the last time value to be added is the record 400 to be executed based on the ETA. If the sum of the time values contained in the fields 410 of each back end record is less than the ETA, then no back end record will be executed.

As an illustration, consider the situation where three back end records are in arranged in order as Record A, Record B and Record C and make up 2 minutes, 3 minutes and 4 minutes of execution time, respectively. Illustratively, the ETA is minutes. Accordingly, the program record to be played based on the ETA is Record B.

Method 1300 then proceeds to step 1308 and determines the programming according to an elapsed time, as indicated by the timer started at step 1120 of method 1100. During operation of the vehicle 100, the program execution logic 244 continues sequential execution of the program records 400 pointed to by the pointers contained in field 306 of the programming profile record 300. The duration of execution of each program record 400 is determined according to the timer value and the time condition information contained in fields 408 and 410 for the respective record 400. The time condition information reflects the user's preferences regarding the execution of a particular record. Thus, at step 1308 the time conditions contained in the records 400 to be executed are compared to the elapsed time recorded by the timer. A determination is thereby made as to which program record 400, if any, should currently be executing according to the elapsed time.

As described above, some embodiments provide for "zero-time" program records, which may be configured for simultaneous execution with other program records and/or may be configured to cause operation of an output device 106 for a predetermined period of time. Thus, steps 1306 and 1308 may include a determination of whether "zero-time" program records are to be executed according to an ETA or elapsed time, respectively. In one embodiment, the "zero-time identifier" field and the "execution check" field described above may be used to advantage. Specifically, the "zero-time identifier" field may be used to preclude inclusion of "zero-time" program records with the summing calculations described above with reference to step 1306. Instead, a separate determination can be made at steps 1306 and 1308 as to when the "zero-time" program record is to be executed based on ETA or elapsed time. For example, as noted above with reference to FIG. 4, "zero-time" program records can include an ETA value or elapsed time value which indicates the desired "start time" for the record. The "execution check" field can be used as a convenient reference field to determine whether a given program record has been executed to avoid redundant and unwanted execution of a device. In the case of an operation having a predetermined time of execution, the value contained in the "execution check" field is changed to indicate execution when the respective device begins operation. Additionally, a time function (e.g., supported by the time logic 245) may be monitored. When the time function meets or exceeds the predetermined time of execution (contained in the fields 408, 410 of the program record 400), the operation of the device is ceased.

Subsequent to step 1306 and step 1308, the method 1300 proceeds to step 1310. At step 1310, the method 1300 queries whether a determination was made at step 1306 to execute a particular back end program record based on the ETA. If no record was identified at step 1306, then the method 1300 proceeds from step 1310 to step 1316, described below. If a record was identified at step 1306, then at step 1312 the value set in memory 232 at step 1304 is overwritten with a new value indicating the record determined by step 1308. Method 1300 then proceeds to step 1314.

At step 1314, method 1300 queries whether the front end priority flag (i.e., the value contained in field 310 of the selected programming profile record 300) is set. As described above, the priority flag enables the vehicle operator to further control the programming during a trip. In this context, "priority" is intended to indicate which program records 400 should be executed in the event that time limitations will not allow execution of all program records 400 contained in fields 306 and 308 of the programming profile record 300. If the priority flag is set, then priority is given to the front end program records, i.e., the program records 400 pointed to by the pointers contained in field 306 of the programming profile record 300. If the priority flag is not set, then priority is given to the back end program records, i.e., the program records 400 pointed to by the pointers contained in field 308 of the programming profile record 300.

Accordingly, if step 1314 is answered negatively, then method 1300 proceeds to step 1320, described below. If step 1314 is answered affirmatively, then method 1300 proceeds to step 1316.

At step 1316 the method 1300 queries whether a determination was made at step 1308 to execute a particular front end program record based on the elapsed time. If so, then at step 1318 the value set in memory 232 at step 1312 is overwritten with a new value indicating the program record to be executed as determined by step 1308. If no program record was identified at step 1308, then the method 1300 proceeds from step 1318 to step 1320, described below.

At step 1320 queries whether the current output (i.e., the program information being executed by the program execution logic 244) is correct. That is, a comparison is made between the program information currently being output to the output devices 106 and the program record represented by the current value contained in memory 232 (i.e., the value stored at steps 1304, 1312 or step 1318). If the current output is correct, method 1300 exits at step 1324. If the current output is not correct, method 1300 proceeds to step 1322 where the correct program information (indicated by the value stored in memory 232) is loaded and executed by the program execution logic 244. Method 1300 then exits at step 1324 (i.e., returns to method 1100).

Figure 14:
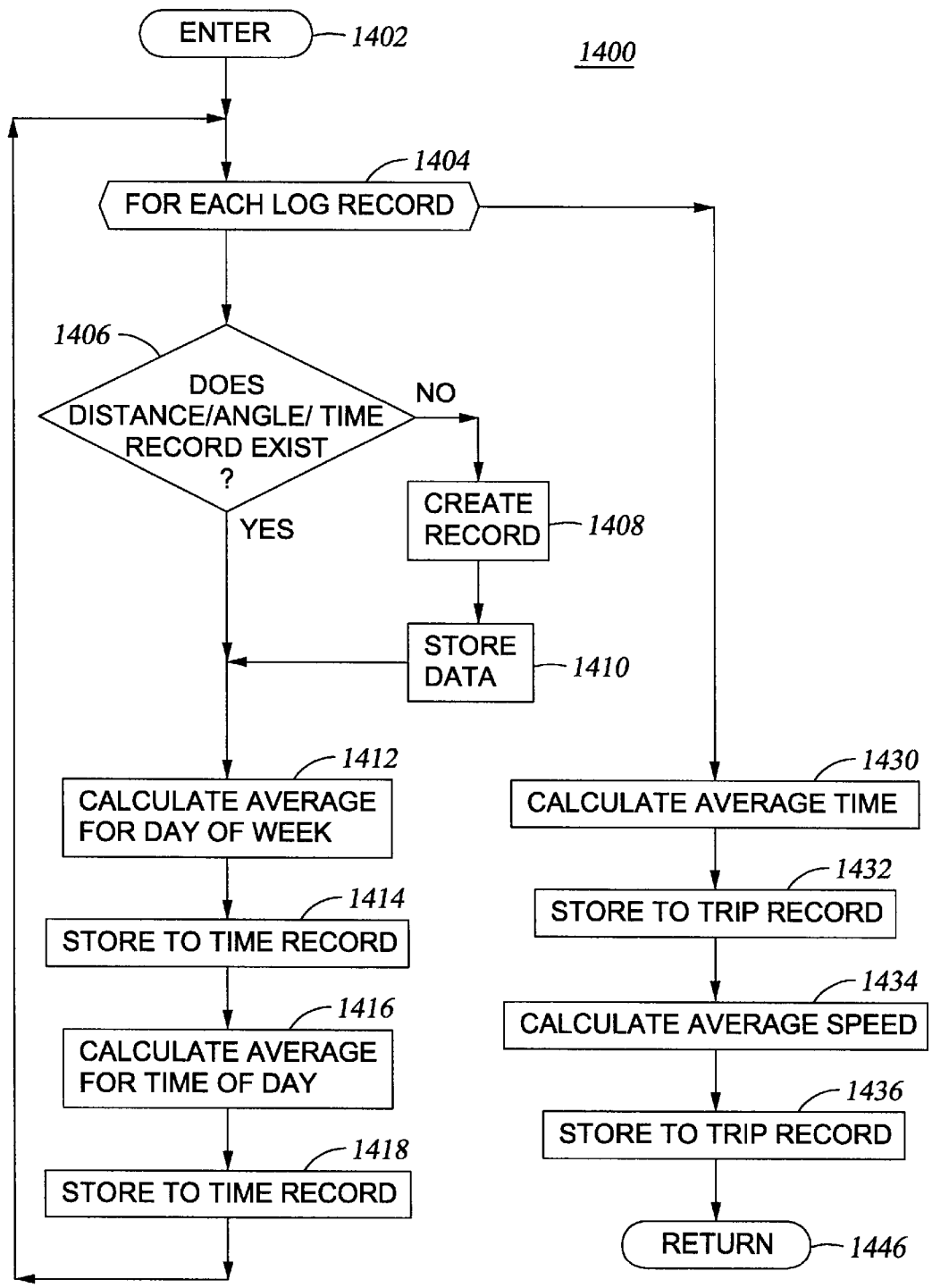
FIG. 14 is a flow diagram illustrating a method of creating and/or storing to data structures adapted to contain trip information.

FIG. 14 shows a method 1400 illustrating one embodiment of step 1144 in FIG. 11. In general, method 1400 describes the processing and handling of each of the log records 900 and time records 800 created during a trip. The method 1400 is entered at step 1402 and proceeds to step 1404 to begin processing a first log record 900. At step 1406, the method 1400 queries whether the appropriate distance record 600, angle record 700, and time record 800 exists for the data contained in the log record 900. If not, method 1400 creates the appropriate records at step 1408 and then stores the data to the appropriate record at step 1410. As noted above, in the case where the destination point was unknown during the trip, the positional data contained in the log record 900 represents the GPS information for the location at the time the log record was created. In such cases, steps 1408 and 1410 include converting the positional information to an angle and a distance value with respect to the destination point (which is now known, assuming the destination point has been reached).

If the appropriate records exist (at step 1406) or once the records are created (at step 1408 and step 1410), method 1400 proceeds to step 1412 and calculates an average time value for the day of the week. The average time value represents the average time needed to travel to the destination point from a given position (distance and angle) on that day of the week within a given time interval (e.g., between 8:00 AM and 8:19 AM). The calculated average value is then stored (at step 1414) to the field of time record 800 corresponding with the current day of the week. That is, the average value is stored to column 806 of the appropriate row 812b–h for the time record 800 corresponding to the appropriate time interval.

In one embodiment, the average time value is calculated (at step 1412) according to:

$$\text{Average value}_{new} = (\text{Average value}_{old} * \text{count}_{old}) + \text{time}/(\text{count}_{old}+1) \quad \text{Equation 2}$$

where "average value$_{new}$" is the value to be calculated and stored to the appropriate field in the time record 800, "average value$_{old}$" is the average value currently contained in the field, "count$_{old}$" is the corresponding count value for the day of the week (contained in column 808 of the time record 800) and "time" is the total time of the trip as recorded by the time started at step 1120 of method 1100. Once the "average value$_{new}$" has been calculated, the counter value is incremented by one, i.e., count$_{new}$=count$_{old}$+1.

Method 1400 then proceeds to step 1416 to calculate an average time value for the time of day. The average time value represents the average time needed to travel to the destination point from a given position (distance and angle) during that time of day, irrespective of the specific day of the week. The average value is then stored to column 806, row 812a of the appropriate time record 800. In one embodiment, this average time value is calculated according to Equation 2 (described above), where: "average value$_{new}$" is the value to be calculated and stored to the appropriate field in the time record 800, "average value$_{old}$" is the average value currently contained in the field, "count$_{old}$" is the value contained in column 808, row 812a of the time record 800 and "time" is the time of the trip from a given position to the destination point as recorded by the timer started at step 1120 of method 1100. Once the "average value$_{new}$" has been calculated, the counter value is incremented by one, i.e., count$_{new}$=count$_{old}$+1.

The method 1400 then returns to step 1404 to retrieve and begin processing the next log record 900. The processing following step 1404 is repeated for each log record 900. Once all the log records have been processed, method 1400 proceeds to step 1430 to begin processing data to be stored in the trip record 500.

At step 1430, method 1400 calculates the average travel time to the destination point. This average travel time is an average value representing all recorded trips to a particular destination point. At step 1432, the calculated value is stored to field 508 of the trip record 500.

At step 1434, method 1400 calculates the average speed of travel to the destination point. This speed is an average value representing all recorded trips to a particular destination point. At step 1436, the calculated value is stored to field 512 of the trip record 500.

Accordingly, method 1400 creates a database of history records, i.e., historical information for trips made by the vehicle 100 and the system 101. The history records include trip records 500, distance records 600, angle records 700 and time records 800. The historical information contained in these records can then be used to determine an ETA for later trips, as described above with reference to FIG. 12.

While the foregoing is directed to the preferred embodiment of the present invention, other and further embodiments of the invention may be devised without departing from the basic scope thereof, and the scope thereof is determined by the claims that follow.

What is claimed is:

1. A method for controlling output to at least one output device from a vehicular data processing system according to a travel time, the method comprising:

parsing trip information comprising a destination position and a route of travel from an origination position to the destination position;

parsing a programming profile selection, wherein the programming profile selection indicates a desired output from the data processing unit according to at least one of an elapsed travel time from the origination position and a remaining travel time to the destination position from a current position; and providing the desired output to the at least one output device connected to the data processing system.

2. The method of claim 1, further comprising periodically changing the desired output according to the programming profile selection.

3. The method of claim 1, wherein the route of travel is defined by a plurality of distance values and a plurality of angle values relative to the destination position.

4. The method of claim 1, wherein the data processing system is disposed on a vehicle and wherein the at least one output device comprises a device disposed on the vehicle.

5. The method of claim 1, wherein the data processing system and the at least one output device are disposed on a vehicle and wherein the programming profile selection contains a reference to an executable program which, when executed by the data processing system, operates the output device.

6. The method of claim 1, wherein the desired output comprises at least one of audio information and visual information.

7. The method of claim 1, wherein the desired output is selected from the group consisting of a radio broadcast signal, an Internet transmission, a compact disc (CD) signal and any combination thereof.

8. The method of claim 1, wherein the desired output is an Internet transmission.

9. The method of claim 1, wherein the remaining travel time is determined according to a position of the data processing unit.

10. The method of claim 1, wherein the step of parsing the programming profile selection comprises a parsing a selection from a menu of a plurality of programming profile records stored on the data processing unit.

11. The method of claim 1, wherein the step of parsing the programming profile selection comprises accessing a program record data structure containing at least one address for an output signal and execution time information for the output signal.

12. The method of claim 1, wherein the step of parsing the programming profile selection comprises determining execution of one of a first plurality of program records, a second plurality of program records, and a third plurality of program records and wherein the programming profile selection includes a priority flag designating an execution priority between the first plurality of program records and the second plurality of program records.

13. The method of claim 1, wherein the step of parsing the programming profile selection comprises parsing a priority value designating an execution priority between at least a first plurality of program records and a second plurality of program records, wherein the program records contain at least one address for an output signal and execution time information for the output signal.

14. The method of claim 13, wherein execution of the first plurality of program records is determined according to the elapsed travel time and the execution of the second plurality of program records is determined according to the remaining travel time.

15. The method of claim 14, wherein the remaining travel time is an estimated time to arrival (ETA) determined by an ETA determination process, comprising:
   determining current positional information for a current position of the data processing system;
   retrieving historical positional information for the current position, wherein the historical positional information includes trip information of at least one previous trip; and
   retrieving historical travel time information associated with the historical positional information, wherein the historical travel time information indicates an average travel time value to the destination position from the current position.

16. The method of claim 15, wherein the step of retrieving historical travel time information comprises:
   locating a time record for a time interval that includes a current time of day; and
   locating the average travel time value for a current day of a week.

17. The method of claim 13, further comprising:
   if the priority value designates the execution priority for the first plurality of program records, providing the desired output according to the elapsed travel time; and
   if the priority value designates the execution priority for the second plurality of program records, providing the desired output according to the remaining travel time.

18. The method of claim 17, wherein the second plurality of program records are arranged as an ordered sequential list having a first program record and a last program record, and wherein providing the desired output according to the remaining travel time comprises:
   determining which current program record of the second plurality of program records to execute such that a duration of sequential execution of the second plurality of program records beginning with the current program record end and ending with the last program record is substantially equal to the remaining travel time.

19. The method of claim 1, further comprising periodically estimating the remaining travel time.

20. The method of claim 19, wherein the step of periodically estimating comprises calculating the travel time according to a predetermined formula using trip information collected during a current trip.

21. The method of claim 1, wherein the remaining travel time is an estimated time to arrival (ETA) determined by an ETA determination process, comprising:
   determining current positional information for a current position of the data processing system;
   retrieving historical positional information for the current position, wherein the historical positional information includes trip information of at least one previous trip; and
   retrieving historical travel time information associated with the historical positional information, wherein the historical travel time information indicates an average travel time value to the destination position from the current position.

22. The method of claim 21, wherein the step of retrieving historical travel time information comprises:
   locating a time record for a time interval that includes a current time of day; and
   locating the average travel time value for a current day of a week.

23. The method of claim 21, wherein the step of retrieving historical travel time information comprises:
   locating a time record for a time interval that includes a current time of day; and
   locating the average travel time value for a similar day of a week.

24. The method of claim 21, wherein the step of determining current positional information comprises receiving global positioning system (GPS) information.

25. The method of claim 21, wherein the step of determining current positional information comprises:

receiving a current GPS position indicating the position of the data processing system; and determining a current angle between an axis originating at the destination position and an axis of a coordinate system centered on the destination position.

26. The method of claim 25, wherein the step of determining historical positional information comprises:

locating a historical distance value substantially equal to the current distance; and locating a historical angle value substantially equal to the current angle.

27. The method of claim 1, wherein the programming profile selection indicates a desired output from the data processing unit according to both the elapsed travel time and the remaining travel time.

28. A signal bearing medium containing a program which, when executed by a processor of a vehicular data processing system, performs a method for controlling output to at least one output device from the vehicular data processing system according to a travel time, the method comprising:

parsing trip information comprising a destination position and a route of travel from an origination position to the destination position;

parsing a programming profile selection, wherein the programming profile selection indicates a desired output from the data processing unit according to at least one of an elapsed travel time from the origination position and a remaining travel time to the destination position from a current position; and providing the desired output to the at least one output device connected to the data processing system.

29. The signal bearing medium of claim 28, further comprising periodically changing the desired output according to the programming profile selection.

30. The signal bearing medium of claim 28, wherein the route of travel is defined by a plurality of distance values and a plurality of angle values relative to the destination position.

31. The signal bearing medium of claim 28, wherein the data processing system is disposed on a vehicle and wherein the at least one output device comprises a device disposed on the vehicle.

32. The signal bearing medium of claim 28, wherein the data processing system and the at least one output device are disposed on a vehicle and wherein the programming profile selection contains a reference to an executable program which, when executed by the data processing system, operates the output device.

33. The signal bearing medium of claim 28, wherein the desired output comprises at least one of audio information and visual information.

34. The signal bearing medium of claim 28, wherein the desired output is selected from the group consisting of a radio broadcast signal, an Internet transmission, a compact disc (CD) signal and any combination thereof.

35. The signal bearing medium of claim 28, wherein the desired output is an Internet transmission.

36. The signal bearing medium of claim 28, wherein the remaining travel time is determined according to a position of the data processing unit.

37. The signal bearing medium of claim 28, wherein the step of parsing the programming profile selection comprises a parsing a selection from a menu of a plurality of programming profile records stored on the data processing unit.

38. The signal bearing medium of claim 28, wherein the step of parsing the programming profile selection comprises accessing a program record data structure containing at least one address for an output signal and execution time information for the output signal.

39. The signal bearing medium of claim 28, wherein the step of parsing the programming profile selection comprises determining execution of one of a first plurality of program records, a second plurality of program records, and a third plurality of program records and wherein the programming profile selection includes a priority flag designating an execution priority between the first plurality of program records and the second plurality of program records.

40. The signal bearing medium of claim 28, wherein the step of parsing the programming profile selection comprises parsing a priority value designating an execution priority between at least a first plurality of program records and a second plurality of program records, wherein the program records contain at least one address for an output signal and execution time information for the output signal.

41. The signal bearing medium of claim 40, wherein execution of the first plurality of program records is determined according to the elapsed travel time and the execution of the second plurality of program records is determined according to the remaining travel time.

42. The signal bearing medium of claim 41, wherein the remaining travel time is an estimated time to arrival (ETA) determined by an ETA determination process, comprising:

determining current positional information for a current position of the data processing system;

retrieving historical positional information for the current position, wherein the historical positional information includes trip information of at least one previous trip; and retrieving historical travel time information associated with the historical positional information, wherein the historical travel time information indicates an average travel time value to the destination position from the current position.

43. The signal bearing medium of claim 42, wherein the step of retrieving historical travel time information comprises:

locating a time record for a time interval that includes a current time of day; and locating the average travel time value for a current day of a week.

44. The signal bearing medium of claim 40, further comprising:

if the priority value designates the execution priority for the first plurality of program records, determining the desired output according to the elapsed travel time; and if the priority value designates the execution priority for the second plurality of program records, determining the desired output according to the remaining travel time.

45. The signal bearing medium of claim 44, wherein the second plurality of program records are arranged as an ordered sequential list having a first program record and a last program record, and wherein determining the desired output according to the remaining travel time comprises:

determining which current program record of the second plurality of program records to execute such that a duration of sequential execution of the second plurality of program records beginning with the current program record end and ending with the last program record is substantially equal to the remaining travel time.

46. The signal bearing medium of claim 28, further comprising periodically estimating the remaining travel time.

47. The signal bearing medium of claim 46, wherein the step of periodically estimating comprises calculating the travel time according to a predetermined formula using trip information collected during a current trip.

48. The signal bearing medium of claim 28, wherein the remaining travel time is an estimated time to arrival (ETA) determined by an ETA determination process, comprising:
   determining current positional information for a current position of the data processing system;
   retrieving historical positional information for the current position, wherein the historical positional information includes trip information of at least one previous trip; and
   retrieving historical travel time information associated with the historical positional information, wherein the historical travel time information indicates an average travel time value to the destination position from the current position.

49. The signal bearing medium of claim 48, wherein the step of retrieving historical travel time information comprises:
   locating a time record for a time interval that includes a current time of day; and
   locating the average travel time value for a current day of a week.

50. The signal bearing medium of claim 48, wherein the step of retrieving historical travel time information comprises:
   locating a time record for a time interval that includes a current time of day; and
   locating the average travel time value for a similar day of a week.

51. The signal bearing medium of claim 48, wherein the step of determining current positional information comprises receiving global positioning system (GPS) information.

52. The signal bearing medium of claim 48, wherein the step of determining current positional information comprises:
   receiving a current GPS position indicating the position of the data processing system; and
   determining a current angle between an axis originating at the destination position and an axis of a coordinate system centered on the destination position.

53. The signal bearing medium of claim 52, wherein the step of determining historical positional information comprises:
   locating a historical distance value substantially equal to the current distance; and
   locating a historical angle value substantially equal to the current angle.

54. The signal bearing medium of claim 28, wherein the programming profile selection indicates a desired output from the data processing unit according to both the elapsed travel time and the remaining travel time.

55. A data processing system adapted to be disposed in a vehicle, comprising:
   a positioning system receiver configured to receive current position information indicating a current position of the data processing system;
   a memory containing at least output signal information;
   output signal execution logic configured to execute the output signal information according to trip information comprising a destination position and a route of travel and at least one of:
      (a) an elapsed travel time from an origination position to the current position; and
      (b) a remaining travel time to the destination position from the current position; and
   at least one output device configured to provide output according to the executed output signal information.

56. The apparatus of claim 55, further comprising an input device to receive from a user destination position information and route of travel information.

57. The apparatus of claim 55, wherein the memory contains an address for the output signal information indicating a location from which the output signal information is retrieved by the output signal execution logic.

58. The apparatus of claim 55, wherein the output signal information is defined as a plurality of data structures arranged in a desired order of execution and wherein the first data structure contains timing information utilized by the output signal execution logic to determine a duration of execution for each of the plurality of data structures.

59. The apparatus of claim 55, further comprising trip recorder logic to collect the historical trip information.

60. The apparatus of claim 55, wherein the memory further contains at least one of a network browser and a File Transfer Protocol (FTP) program.

61. The apparatus of claim 55, wherein the output signal information comprises information pre-selected by a user.

62. The apparatus of claim 55, wherein the output signal information comprises at least one of audio information and video information.

63. The apparatus of claim 55, wherein the at least one output device comprises a network device configured to communicate with a network.

64. The apparatus of claim 55, wherein the at least one output device comprises a network device configured to communicate with the Internet.

65. The apparatus of claim 55, wherein the at least one output device is selected from a group consisting of a radio, a network device, a compact disc (CD) player, a Minidisk player and any combination thereof.

66. The apparatus of claim 55, wherein the output signal information comprises a first signal information portion and a second signal information portion and wherein one portion is given an execution priority according to a priority value set by a user.

67. The apparatus of claim 66, wherein the first signal information portion is executed according to the elapsed travel time and the second signal information portion is executed according to the remaining travel time.

68. The apparatus of claim 55, further comprising arrival time estimator logic configured to determine the remaining travel time as an estimated time to arrival (ETA).

69. The apparatus of claim 68, wherein the arrival time estimator logic is configured to use the current position information and historical trip information.

70. The apparatus of claim 55, further comprising:
   a data structure located in the memory and comprising historical trip information of at least one previous trip including historical positional information and historical travel time information associated with the historical positional information, wherein the historical travel time information indicates an average travel time value to the destination position from the current position; and
   arrival time estimator logic configured to determine the remaining travel time as an estimated time to arrival (ETA) to the destination point using the current position information and the historical trip information.

71. The apparatus of claim 70, wherein the historical trip information contained in the data structure further comprises historical travel time information associated with the historical positional information and indicating an average travel time value to the destination position from the current position.

72. The apparatus of claim 70, wherein the historical trip information contained in the data structure further comprises historical travel time information associated with the historical positional information and indicating an average travel time value to the destination position from the current position within a current time interval.

73. The apparatus of claim 55, wherein the output signal execution logic is configured to execute the output signal information according to both the elapsed travel time and the remaining travel time.

* * * * *